No. 872,647. PATENTED DEC. 3, 1907.
S. G. DAVIS.
TIRE.
APPLICATION FILED MAY 3, 1907.
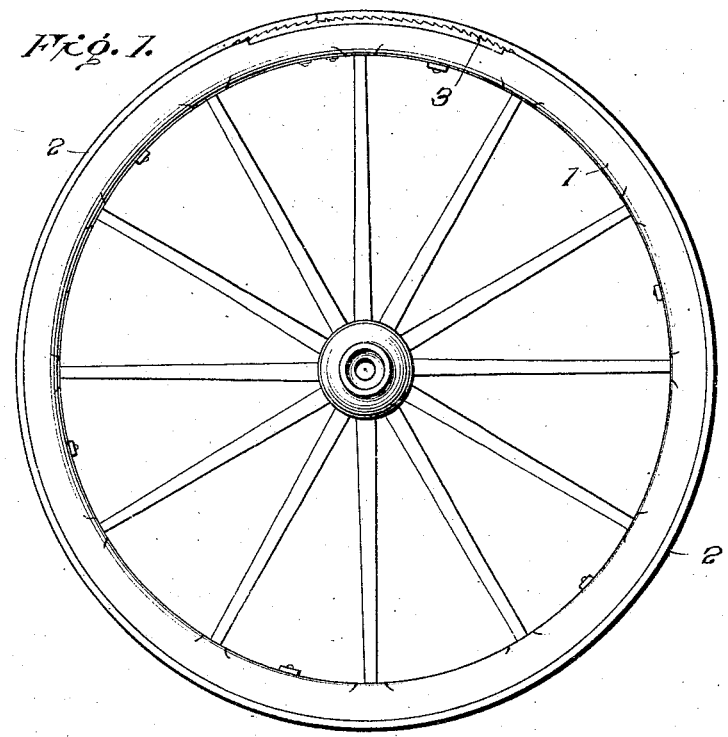
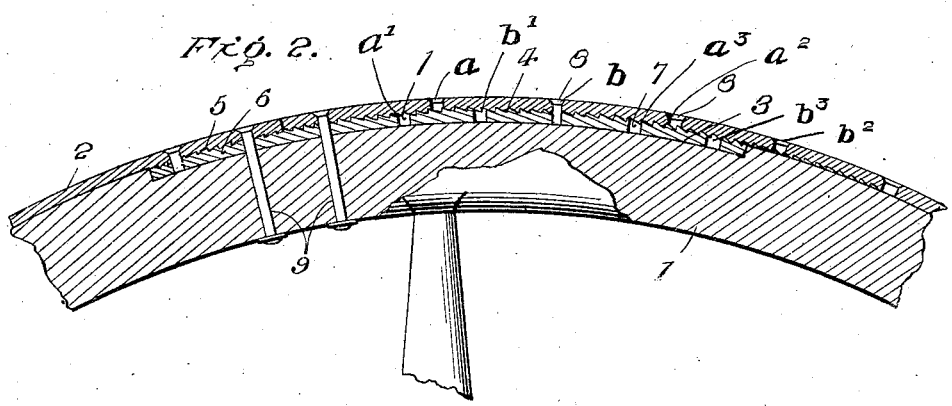
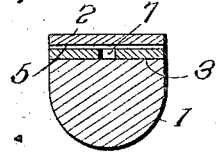
Inventor
Stephen G. Davis,
Witnesses
By
Attorneys

UNITED STATES PATENT OFFICE.

STEPHEN G. DAVIS, OF COOPER, IOWA.

TIRE.

No. 872,647.

Specification of Letters Patent.

Patented Dec. 3, 1907.

Application filed May 3, 1907. Serial No. 371,697.

*To all whom it may concern:*

Be it known that I, STEPHEN G. DAVIS, citizen of the United States, residing at Cooper, in the county of Greene and State of Iowa, have invented certain new and useful Improvements in Tires, of which the following is a specification.

This invention has for its object an improved construction of vehicle tire which is so arranged that the tire may be easily tightened whenever necessary without the necessity of the services of an expert blacksmith or wheelwright.

For a full understanding of the invention and the merits thereof and also to acquire a knowledge of the details of construction of the means for effecting the result, reference is to be had to the following description and accompanying drawings, in which:

Figure 1 is a side elevation of a wheel embodying the improvements of my invention. Fig. 2 is a longitudinal sectional view of a portion of the wheel rim on an enlarged scale. Fig. 3 is a transverse sectional view.

Corresponding and like parts are referred to in the following description and indicated in all the views of the drawings by the same reference characters.

Referring to the drawings, 1 designates the felly of a wheel and 2 my improved tire.

The tire is in the form of a split band of iron or steel and is designed to overlap, at the joint, a recess 3 formed in the outer side of the felly. The ends of the tire abut as clearly illustrated in the drawings, and they are formed with inclined teeth, the inclined teeth 4 of one end inclining in one direction, and the teeth 5 of the other end in the opposite direction. A segmental fillet 6 fits in the recess 3 and is also formed with teeth designed to interlock with the teeth of the two tire ends. The fillet 6 is formed with a plurality of apertures 7, which may be, for instance, at intervals of about three-eighths of an inch apart. The ends of the tire are also formed with a plurality of apertures 8 which are preferably farther apart than the apertures 7. Two of the apertures 8 are adapted to register with the two apertures 7 of the series of apertures in the fillet 6, at every adjustment of the tire, and bolts 9 are designed to extend through the registering apertures to secure the two ends of the tire in interlocking engagement with the fillet and to also secure both of said ends of the fillet rigidly on the felly of the wheel.

It is of course understood that at every adjustment or tightening operation of the tire, a portion of that end with the longer series of teeth is cut off, so as to bring the two ends of the tire into an abutting relation. Both ends of the tire are of the same width or thickness, as indicated in the drawings.

It is to be noted that there are a plurality of apertures in the fillet piece as well as in the overlapping end of the tire. These two sets of apertures bear a definite relation to each other, so that two or more apertures will register every time a certain amount of metal is cut from the longer end of the tire, or that end which has the most holes in it to tighten the tire and bring the two ends thereof into abutting relation. At every adjustment, holes may be bored through the felly so that the bolts may be passed through those apertures of the fillet piece and tire that are in registry at the time.

Having thus described the invention, what is claimed as new is:

A wheel provided with a felly formed with a recess in its outer side, a fillet fitting in said recess and formed with a plurality of equidistant apertures relatively close together, and a tire encircling the felly and provided with a joint, the ends of the joint abutting against each other and extending over the fillet, said ends being formed with a plurality of apertures relatively farther apart than the apertures in the fillet, the longer of the abutting ends being formed with interlocking teeth, and bolts one on each side of the joint and adapted to extend through registering apertures in the ends next to the joint and through the fillet and felly, substantially as shown and described.

In testimony whereof I affix my signature in presence of two witnesses.

STEPHEN G. DAVIS. [L. S.]

Witnesses:
THOS. A. LYNCH,
HARRY E. COLE.